United States Patent [19]

Taniai et al.

[11] Patent Number: 5,077,664
[45] Date of Patent: Dec. 31, 1991

[54] DIRECT MEMORY ACCESS CONTROLLER

[75] Inventors: Takayoshi Taniai; Atsushi Fujihira, both of Kawasaki, Japan

[73] Assignee: Fujitsu Limited, Kawaskai, Japan

[21] Appl. No.: 318,283

[22] Filed: Mar. 3, 1989

[30] Foreign Application Priority Data

Mar. 8, 1988 [JP] Japan ............................... 63-54366
Apr. 13, 1988 [JP] Japan ............................... 63-90942

[51] Int. Cl.⁵ ........................ G06F 13/00; G11C 8/00
[52] U.S. Cl. ............................ 395/425; 364/DIG. 1; 365/230.01
[58] Field of Search ..................... 364/200, 900; 365/230.01

[56] References Cited

U.S. PATENT DOCUMENTS 4,783,730 11/1988 Fischer ........................... 364/200

Primary Examiner—Alyssa H. Bowler
Attorney, Agent, or Firm—Armstrong, Nikaido, Marmelstein, Kubovcik & Murray

[57] ABSTRACT

A direct memory access controller coupled to a system bus of a system including a memory, for controlling a data transfer by a direct memory access, includes a register registering a code which designates one of a plurality of descriptor formats, each of which defines both the number and type of descriptors necessary for the data transfer by the direct memory access, a group of registers for registering descriptors defined in one of the descriptor formats which is selected by the code registered in the register, a controller for controlling the data transfer by the direct memory access in accordance with the descriptors defined in the selected one of the descriptor formats registered in the register.

19 Claims, 12 Drawing Sheets

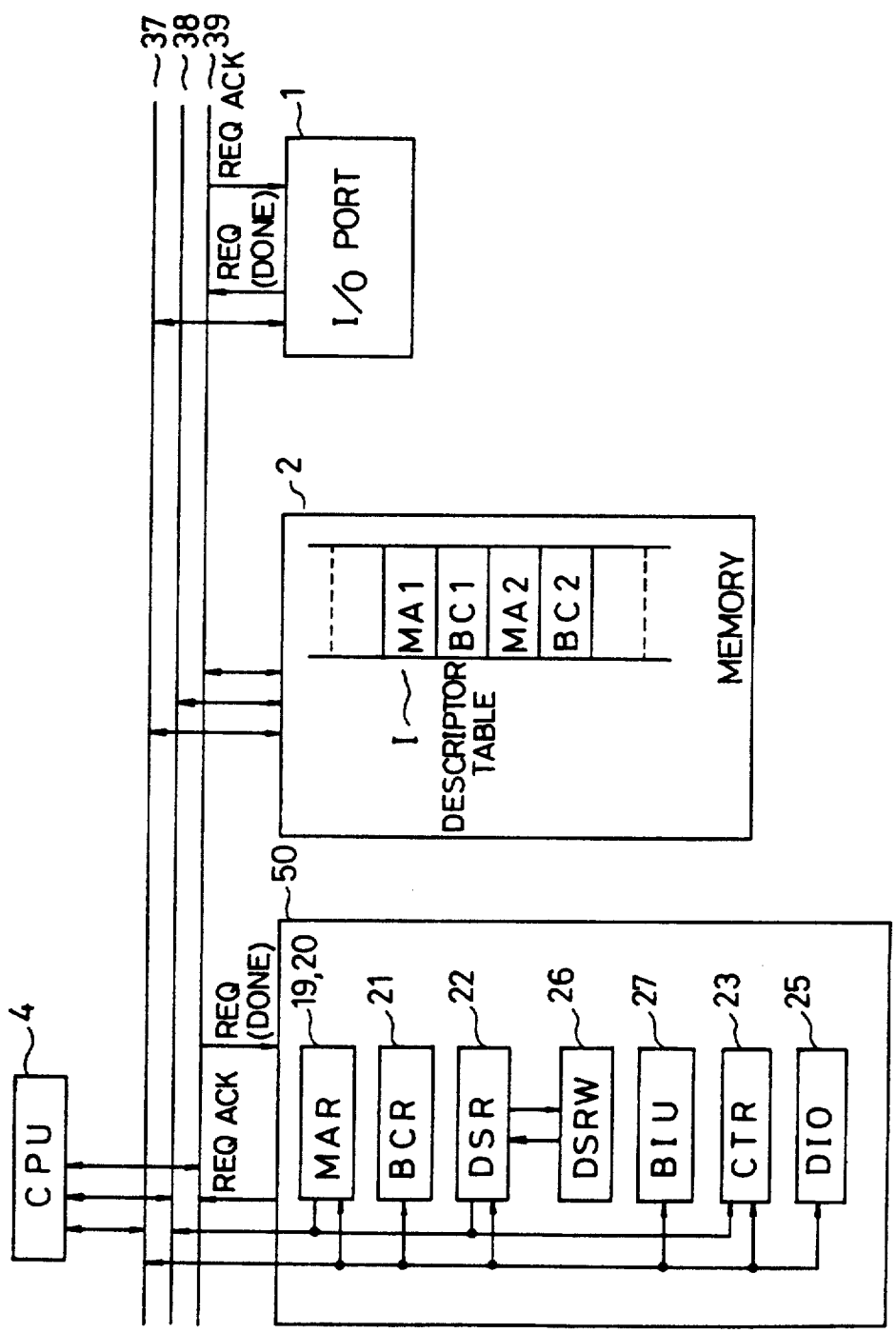

DIRECT MEMORY ACCESS CONTROLLER

BACKGROUND OF THE INVENTION

The present invention generally relates to a direct memory access controller, and more particularly to a direct memory access controller having a plurality of descriptor formats which define the number and type of transfer information (descriptors) necessary for a direct memory access transfer.

Recently, it is required to transfer a large amount of data such as image data with extremely high speed between a data processing system such as a personal computer and a workstation, and an external unit such as a disc unit. It is also required to transfer a large amount of data between memories provided in the system with extremely high speed. A conventional data transfer is carried out under the control of a central processing unit (hereafter simply referred to as CPU) provided in the data processing apparatus. Therefore, the bit rate of the conventional data transfer depends on the processing speed of the CPU. From this viewpoint, it is impossible to transfer data at a speed in excess of the processing speed of the CPU. Further, it takes long to transfer a large amount of data even when the data is low-speed data. From the above-mentioned viewpoints, a direct memory access transfer is used which enables it to be possible to transfer data between the data processing apparatus and the external unit without using the CPU. Hereafter, direct memory access is simply referred to as DMA. The DMA transfer is intended to effectively process a large amount of data and high-speed data.

Generally, in the DMA transfer, data is transferred in accordance with descriptors which are information necessary for the DMA transfer. A descriptor format defines both the number and type of descriptors necessary for the DMA transfer, such as a source address, a destination address, and the number of bytes of data to be transferred. However, in the conventional DMA transfer, a single descriptor format is defined. In other words, all the DMA transfer operations are controlled by the single descriptor format. A plurality of types of DMA transfer are proposed. Examples of those are a register direct mode, and a descriptor chain mode, which is further classified into a sequential descriptor chain mode and a link descriptor chain mode. It is noted that all the information defined in the descriptor format are not always necessary to carry out the DMA transfer. However, in the conventional DMA transfer, all the information are stored in the memory, because a single descriptor format is defined. As a result, it is necessary to store the descriptors with a large amount of memory capacity. In addition, the data transfer speed is not high.

SUMMARY OF THE INVENTION

It is therefore a general object of the present invention to provide a novel and useful direct memory access controller.

A more specific object of the present invention is to provide a direct memory access controller having a plurality of descriptor formats, by which it becomes possible to reduce the memory capacity.

Another object of the present invention is to provide a direct memory access controller which can present a direct memory access transfer at an increased speed.

The above objects of the present invention can be achieved by a direct memory access controller coupled to a system bus of a system including a memory, for controlling a data transfer by a direct memory access, including an internal bus; data control means coupled to the system bus and the internal bus, for controlling an exchange of data between the system bus and the internal bus; transfer request control means coupled to the internal bus, for receiving a transfer request signal; and a register registering a code which designates one of a plurality of descriptor formats. Each of which defines the number and type of descriptors necessary for the data transfer by the direct memory access. The direct memory access controller further includes register means for registering descriptors defined in one of the descriptor formats which is selected by the code registered in the register; and control means activated by the transfer request signal supplied through the transfer request control means, for controlling the data transfer by the direct memory access in accordance with the descriptors defined in the selected one of the descriptor formats registered in the register means.

Other objects, features and advantages of the present invention will become apparent from the following detailed description when read in conjunction with the accompanying drawings.

BRIEF DESCRIPTION OF THE DRAWINGS

FIG. 7 is a block diagram for explaining operation of the embodiment of FIG. 6;

DESCRIPTION OF THE PREFERRED EMBODIMENTS

Figure 1:
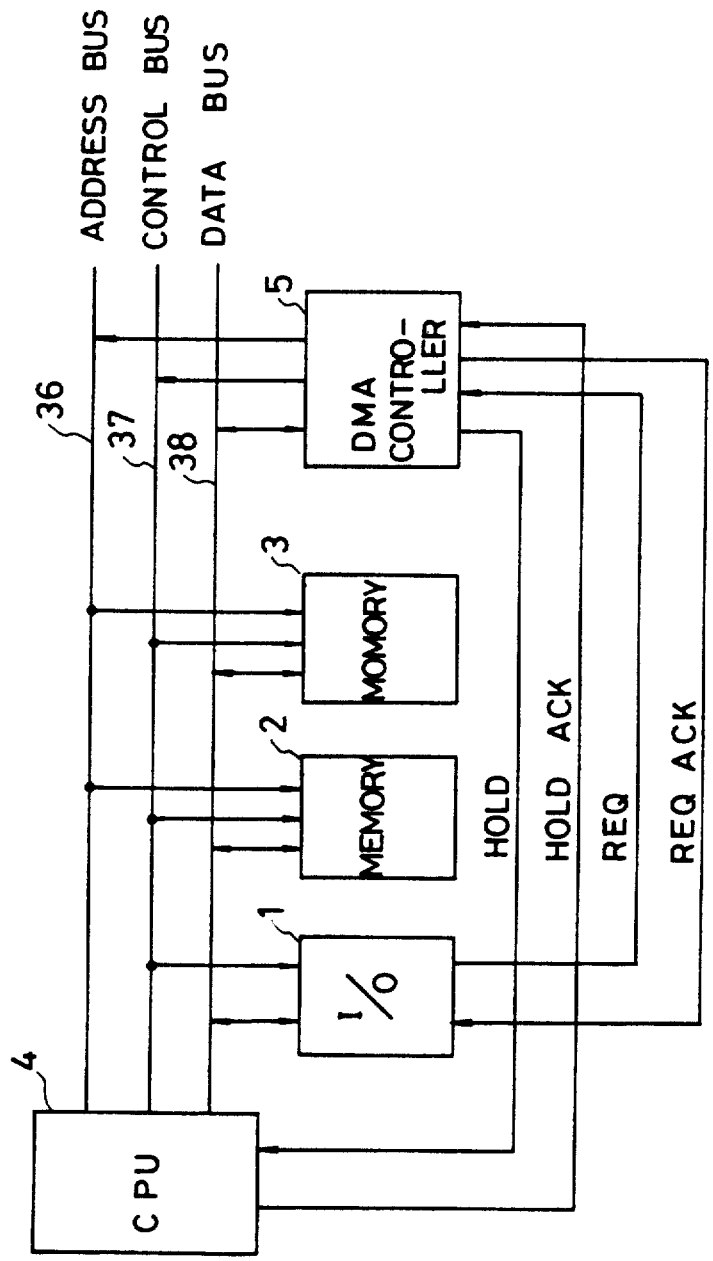
FIG. 1 is a block diagram of a data processing system in which a DMA controller is employed.

A description is given of a general DMA transfer with reference to FIG. 1, in order to facilitate the understanding of the present invention. A DMA controller is a part of a data processing system such as a microcomputer, a personal computer and a workstation. The DMA transfer makes it possible to directly transfer data between units or devices such as memories provided in the data processing system, or to directly transfer data between an external unit or device such as a disc unit and the memory provided in the system. By way of example, the latter case is described below.

Referring to FIG. 1, it is now assumed that a CPU 4 is processing data while exclusively using an address bus 36, a control bus 37 and a data bus 38. When a request for the data transfer occurs in an input/output port (hereafter simply referred to as an I/O port) 1, a request signal REQ generated therein is supplied to a direct memory access controller (hereafter simply referred to as a DMA controller) 5. Then, the DMA controller 5 supplies the CPU 4 with a hold request signal HOLD through the control bus 37 in order to request the CPU 4 to release the address bus 36, the control bus 37 and the data bus 38. When receiving the hold request signal HOLD, the CPU 4 sends a hold acknowledge signal HOLD ACK to the DMA controller 5, and then transfers the bus using right to the DMA controller 5. Thereby, the DMA controller 5 can exclusively use the buses 36, 37 and 38, and is allowed to carry out the DMA transfer. Then the DMA controller 5 sends a request acknowledge signal REQ ACK to the I/O port 1.

Figure 2:
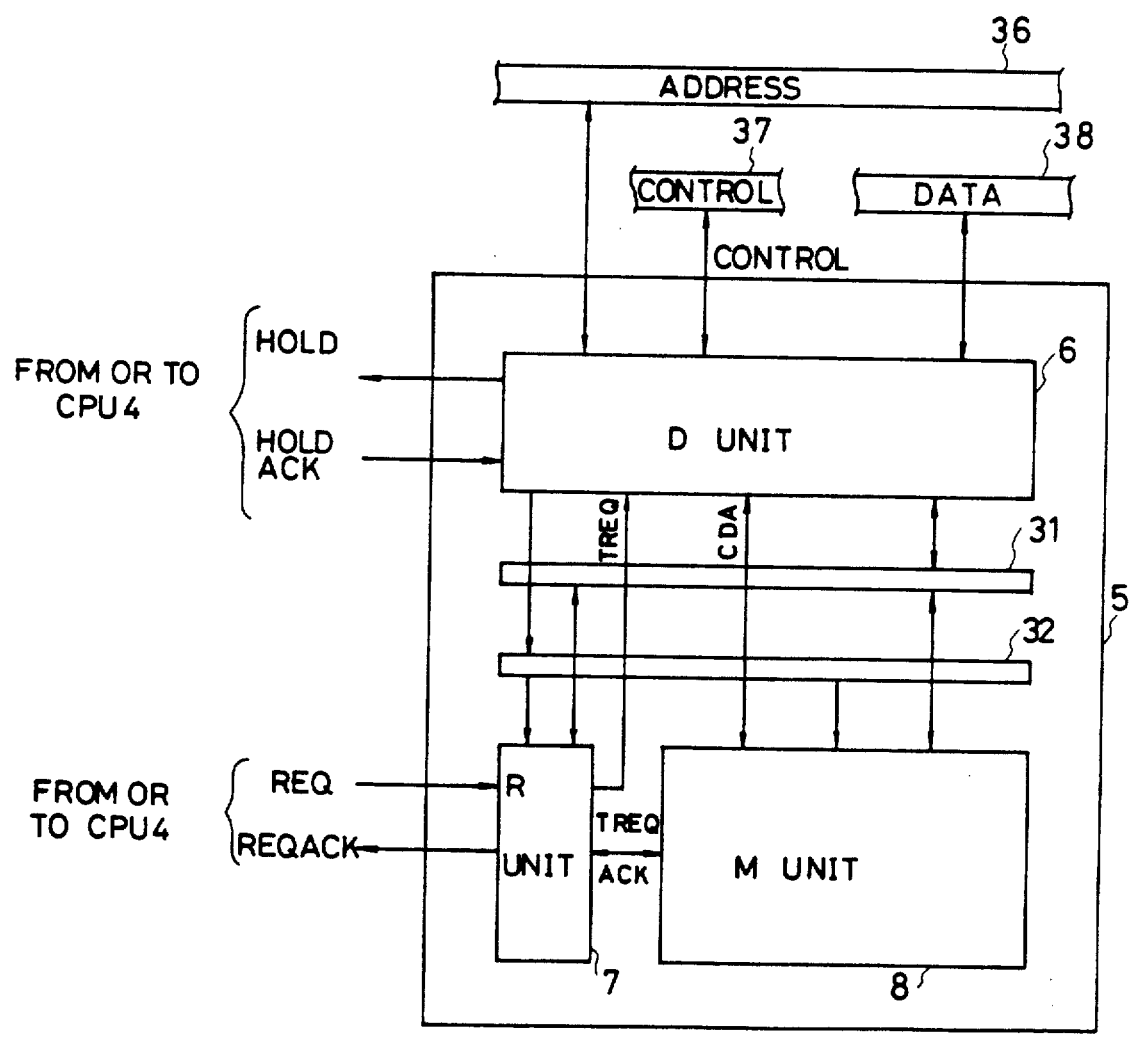
FIG. 2 is a block diagram of a DMA controller used in the structure of FIG. 1.

FIG. 2 is a block diagram illustrating the structure of the DMA controller 5 shown in FIG. 1. The DMA controller 5 includes a data control unit (hereafter simply referred to as a D unit) 6, a transfer request control unit (hereafter simply referred to as an R unit) 7, and a microsequence control unit 8 (hereafter simply referred to as an M unit). The units 6, 7 and 8 are mutually connected through an internal data bus 31 and an internal address bus 32. When the R unit 7 is supplied with the request signal REQ from the I/O port 1, the R unit 7 returns the request acknowledge signal REQ ACK to the I/O port 1. Then the R unit 7 outputs a transfer request signal TREQ to the D unit 6 and the M unit 8. Upon receiving the transfer request signal TREQ, the M unit 8 sends to the D unit 6 control information CDA necessary for the desired DMA transfer, and at the same time, sends an acknowledge signal ACK to the R unit 7. When the D unit 6 receives the transfer request signal TREQ, it supplies the CPU 4 with the hold signal HOLD. When the hold acknowledge signal HOLD ACK is input to the D unit 6, the desired DMA transfer is started through the D unit 6, the address bus 36 and the data bus 38.

Generally, the DMA transfer includes two transfer modes; one of which is a register direct mode, and the other is a descriptor chain mode. The descriptor chain mode is also classified into two modes; one being a sequential descriptor chain mode, and the other being a link descriptor chain mode. In the register direct mode, the CPU 4 directly writes information (descriptors) on a source address, a destination address, and a byte count into registers built in the DMA controller 5, and then the DMA transfer is carried out by referring to the written descriptors. In the descriptor chain mode, the DMA controller 5 writes, into the corresponding registers, the source and destination addresses and the byte count, which are stored beforehand in a memory 2 (or 3) in the form of a table and are read out therefrom in accordance with a microprogram which consists of microcodes and is stored in the DMA controller 5. Thereafter the data transfer is performed. In the latter case, a set of source address, destination address, and byte count is defined in the descriptor format (DF). That is, the descriptor format defines three predetermined descriptors.

However, in the conventional DMA transfer, the single descriptor format is fixed and all the descriptors defined therein are referred to each time one block of data is transferred. Therefore, the memory 2 or 3 must store all the descriptors consisting of the source address, the destination address and the byte count for each data block to be transferred. This requires a large amount of memory capacity. For example, when a request occurs which requests the DMA transfer between the memory 2 and 3, the source address, the destination address and the byte count are set in corresponding internal registers in the DMA controller 5. In this case, two bus cycles are necessary to output the source address and the destination address to the address bus 36. Such a procedure is called a dual transfer. It is noted that the memories are managed by address information. On the other hand, in the DMA transfer between the I/O port 1 and the memory 2 or 3, one of the source address and the destination address is enough to achieve the DMA transfer, because the I/O port 1 is not managed with the address information but the request acknowledge signal REQ ACK. In other words, any one of the source and destination addresses is unnecessary for the DMA transfer between the I/O port 1 and the memory 2 or 3. For example, in the DMA transfer where data is transferred from the memory 2 or 3 to the I/O port 1, data on the data bus 38 is enabled to be input in the I/O port 1 by setting the source address and the byte count. On the other hand, in the DMA transfer where data is transferred from the I/O port 1 to the memory 2 or 3, data on the data bus 38 is enabled to be input in the memory 2 or 3 by setting the destination address and the byte count. In this manner, one bus cycle is enough to output the descriptor to the address bus 36. This operation is defined a single transfer. In the single transfer, since the descriptor format DF is single and fixed, a descriptor unnecessary for the requested DMA transfer mode must be stored in the memory 2 or 3. As a result, the single transfer mode is wasteful of a memory area which is assigned in the memory 2 or 3 in order to store the descriptors in the form of table. In addition, since all the descriptors must be accessed each time the DMA transfer is requested, it is very difficult to obtain a high-speed DMA transfer.

The present invention intends to overcome the problems of the conventional DMA transfer. A description is given of a preferred embodiment of the present invention with reference to FIG. 3.

Figure 3:
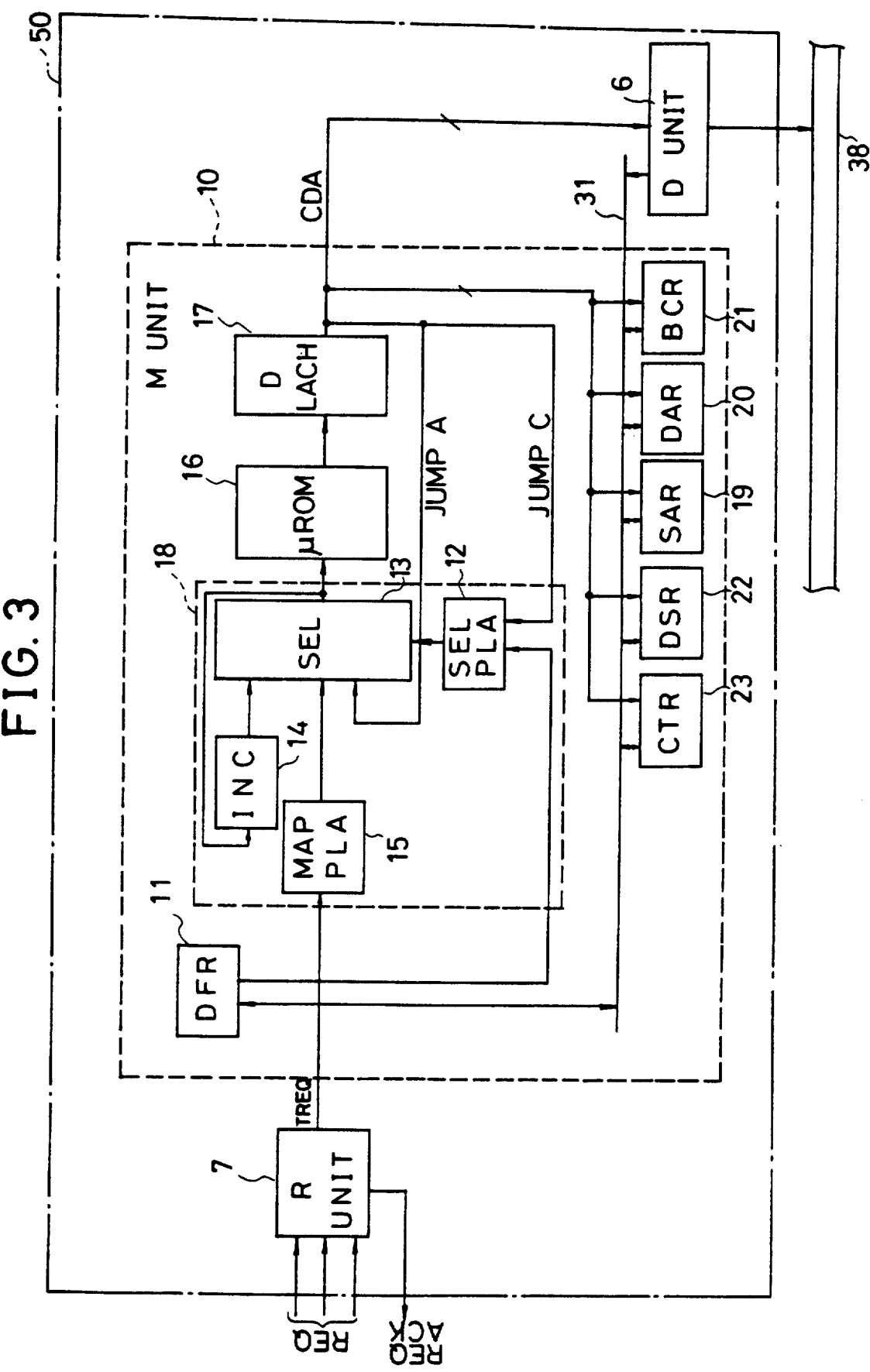
FIG. 3 is a block diagram of the DMA controller of a preferred embodiment of the present invention.

FIG. 3 is a block diagram of a DMA controller which is a preferred embodiment of the present invention. In FIG. 3, those parts which are the same as those in the previous figures, are given the same reference numerals. The present embodiment has essential features with respect to initialization which is performed at the commencement of each DMA transfer. The initialization is primarily associated with the M unit. Therefore, the R unit 7 and D unit 6 in the embodiment are not described in detail.

Referring to FIG. 3, a DMA controller 50 of the present embodiment includes a microsequence control unit (an M unit) 10, in which a descriptor format register DFR 11 is provided. The descriptor format register 11 is one of transfer mode registers. In addition to the descriptor format register 11, the transfer mode registers comprise a register (not shown) for designating the DMA transfer mode such as the single mode and the dual mode, and a register (not shown) for designating one of the register direct mode and the descriptor chain mode. The descriptor format register 11 and the other registers can be set by the CPU 4. A desired value is set beforehand by users to the descriptor format register 11 through the CPU 4. The descriptor format register stores information as to which one of a plurality of descriptor formats should be selected. In the present embodiment, three descriptor formats are prepared, which are represented by a two-bit code.

Table 1 shows values of the descriptor format code DF and the corresponding contents of the descriptor format. As will be described in detail later, descriptors defined in the selected descriptor format are read out from the memory in which a descriptor table is stored. The descriptors are written into the memory 2 (or 3) by the CPU 4 ahead of the start of the DMA transfer.

TABLE 1

| DF | Contents |
|---|---|
| 00 | Enter the source and destination addresses and the byte count from the descriptor table. |
| 01 | Not used. |
| 10 | Enter the source address and the byte count from the descriptor table. |
| 11 | Enter the destination address and the byte count from the descriptor table. |

Data registered in the descriptor format register 11, or the descriptor format code DF is supplied to a selector programmable logic array 12 (hereafter simply referred to as a selector PLA), which forms a matrix table. A jump code JUMP C is supplied to the selector PLA 12 from a data latch element 17. When receiving the jump code JUMP C, the selector PLA 12 makes a decision on which descriptor format code DF is set in the descriptor format register 11. The decision result is supplied to a selector 13, which is also provided with an output signal supplied from an increment element 14, an output signal supplied from a mapping programmable logic array (hereafter simply referred to as a mapping PLA) 15, and a jumping address JUMP A supplied from the data latch element 17. The selector 13 selects one of the input signals on the basis of the decision result supplied from the selector PLA 12, and outputs the selected signal, as address information, to a micro-read-only-memory (hereafter simply referred to as a micro-ROM) 16. The jump address JUMP A is a piece of control information, which will be described in detail later. The increment element 14 is a counter, for example, and thereby the address information with respect to the micro-ROM 16 is incremented by 1 each time the selector 13 selects one of the input signals. The micro-ROM 16 stores a program which is necessary for initialization for the DMA transfer. A program stored in the micro-ROM 16 is hereafter simply referred to as a microprogram. The proceeding of the microprogram is controlled, depending on the output signal of the selector 13. The micro-ROM 16 outputs control information in accordance with the proceeding of the microprogram. The control information derived from the micro-ROM 16 is latched in the data latch element 17, and is then output therefrom as control information information CDA. The mapping PLA 15 stores a start address and branch address for the microprogram, and supplies the selector 13 with the start address, when the transfer request signal REQ is supplied thereto from the R unit 7.

The selector PLA 12, the selector 13, the increment element 14 and the mapping PLA 15 construct a transfer information setting block 18. The control information CDA is supplied to the D unit 6, and also a source address register SAR 19, a destination address register DAR 20, a byte count register BCR 21, a descriptor address register DSR 22, and a chain terminator register CTR 23. These registers are connected to the internal data bus 31. The source register 19 registers the source address of a memory area where data to be transferred by the DMA transfer is stored. The destination register 20 registers the destination address of a memory area into which the transferred data is to be written. The byte count register 21 registers the byte count by which data is to be transferred. The descriptor chain register 22 registers an address of a descriptor table which is formed in the memory 2 (or 3). The chain terminator register 23 registers the number of blocks to be transferred in the case where the sequential descriptor chain mode is set. In the case where the link descriptor chain mode is set, the chain terminator register 23 registers the descriptor table address at which the DMA transfer should be terminated. Each register is supplied with the corresponding data in accordance with the control information CDA.

Figure 4A:
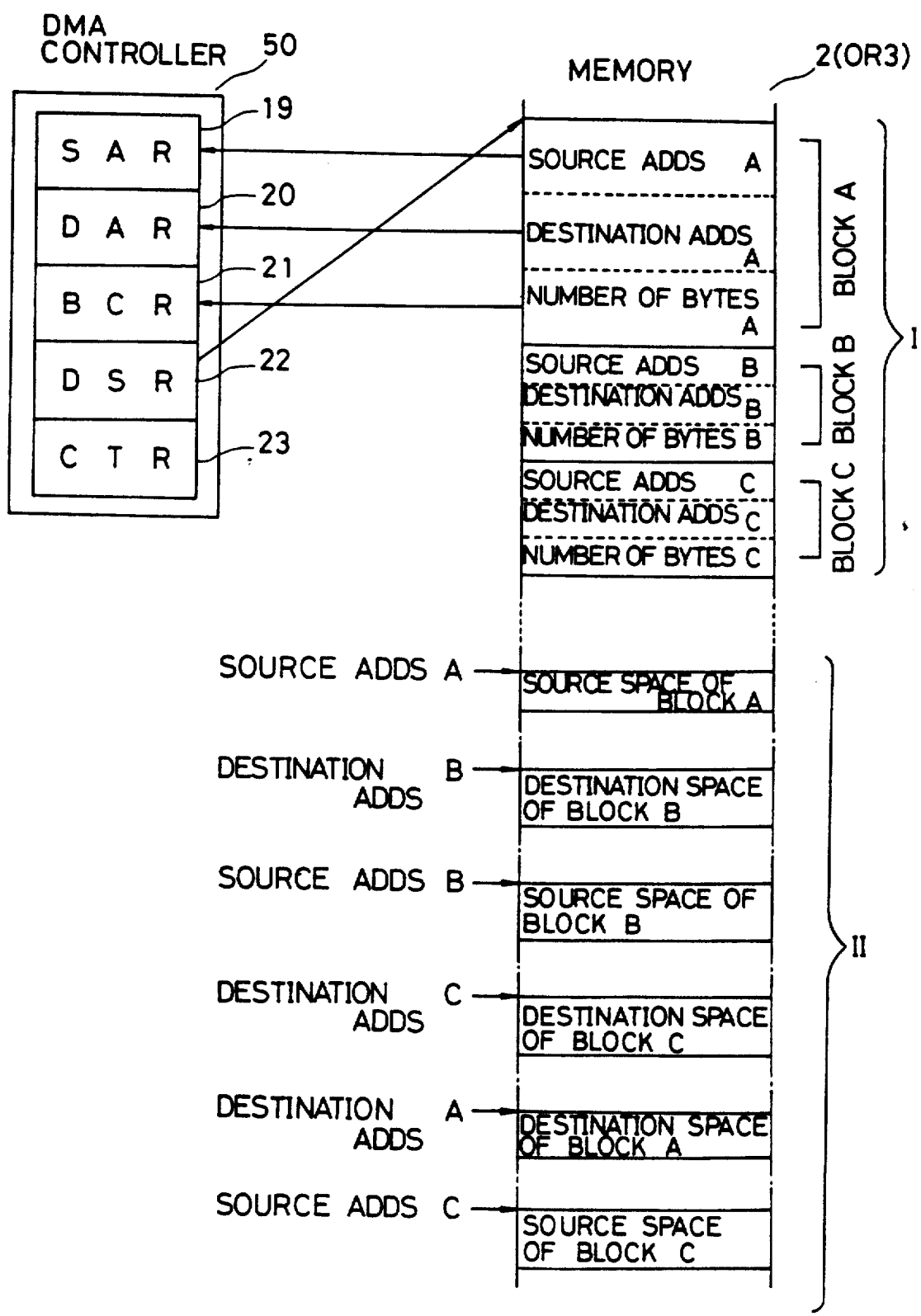
FIGS. 4A through 4C are views illustrating an example of the sequential descriptor chain mode according to the embodiment of the present invention.

FIG. 4A illustrates an example of the sequential descriptor chain mode. The memory 2 (or 3) has a descriptor table I which includes descriptors relating to blocks A, B and C, and a data area II which includes data blocks relating to the blocks A, B and C. The illustrated example relates to the case where the descriptor format code DF is "00". In the sequential descriptor chain mode, the descriptor formats are successively registered in the descriptor table I. At the commencement of the DMA transfer operation, source address A, destination address A and byte count A in respect of the block A are read out from the descriptor table I, and are then written into the source register 19, the destination address register 20 and the byte count register 21, respectively. At this time, the descriptor address register 22 has an address which indicates the start address of the memory area (descriptor table I) in which the descriptor format relating to the block A is registered. The address value in the descriptor address register 22 are renewed each time when each descriptor is read out. The use of the descriptor formats as illustrated in FIGS. 4B and 4C is the most important feature of the present embodiment.

Figure 4B:
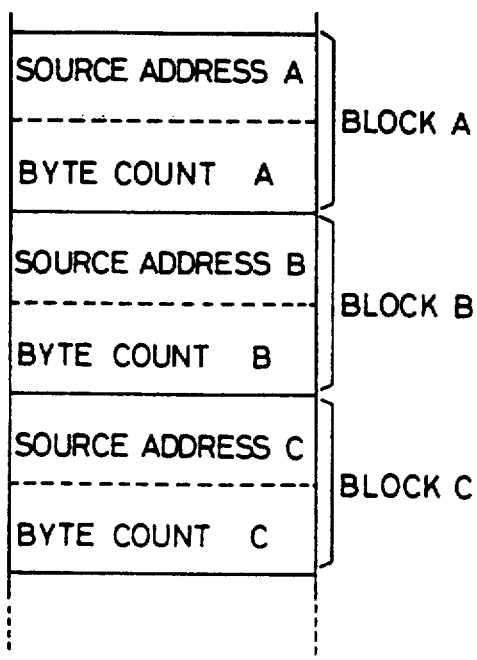
Figure 4C:
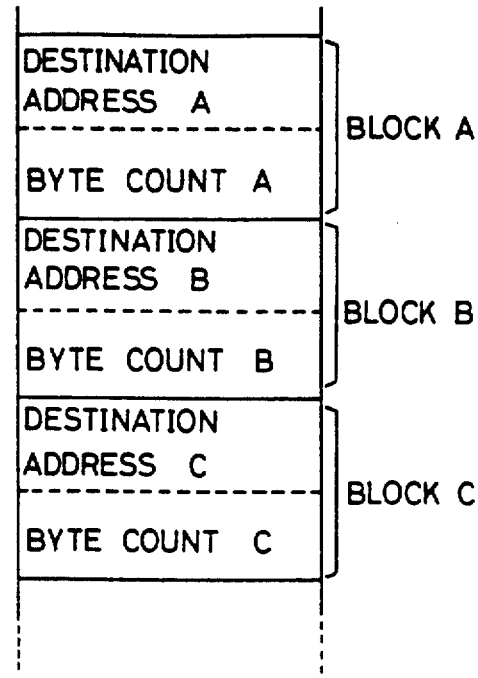

FIG. 4B illustrates an example of the contents of the descriptor table I in the sequential descriptor chain mode where the descriptor format code DF is "10". FIG. 4C illustrates an example of the contents of the descriptor format I in the sequential descriptor chain mode where the descriptor format code DF is "11".

Figure 5B:
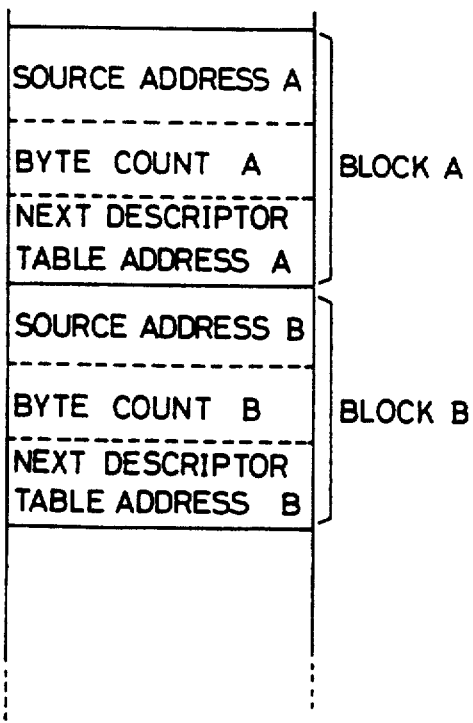
FIGS. 5A through 5C are views illustrating an example of the link descriptor chain mode according to the embodiment of the present invention.
Figure 5C:
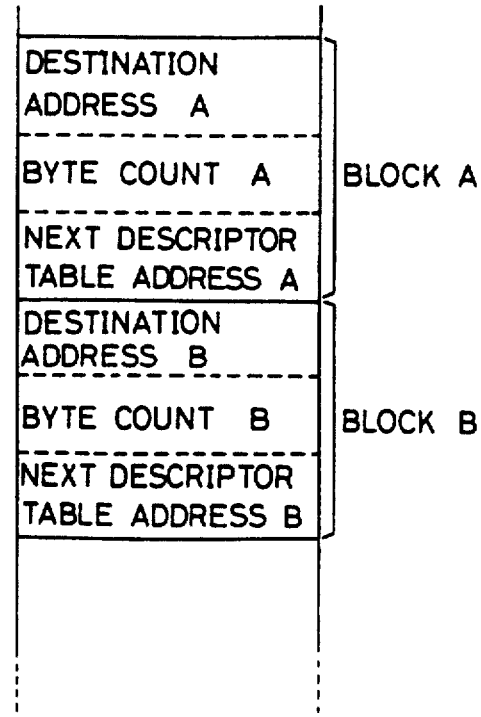
Figure 5A:
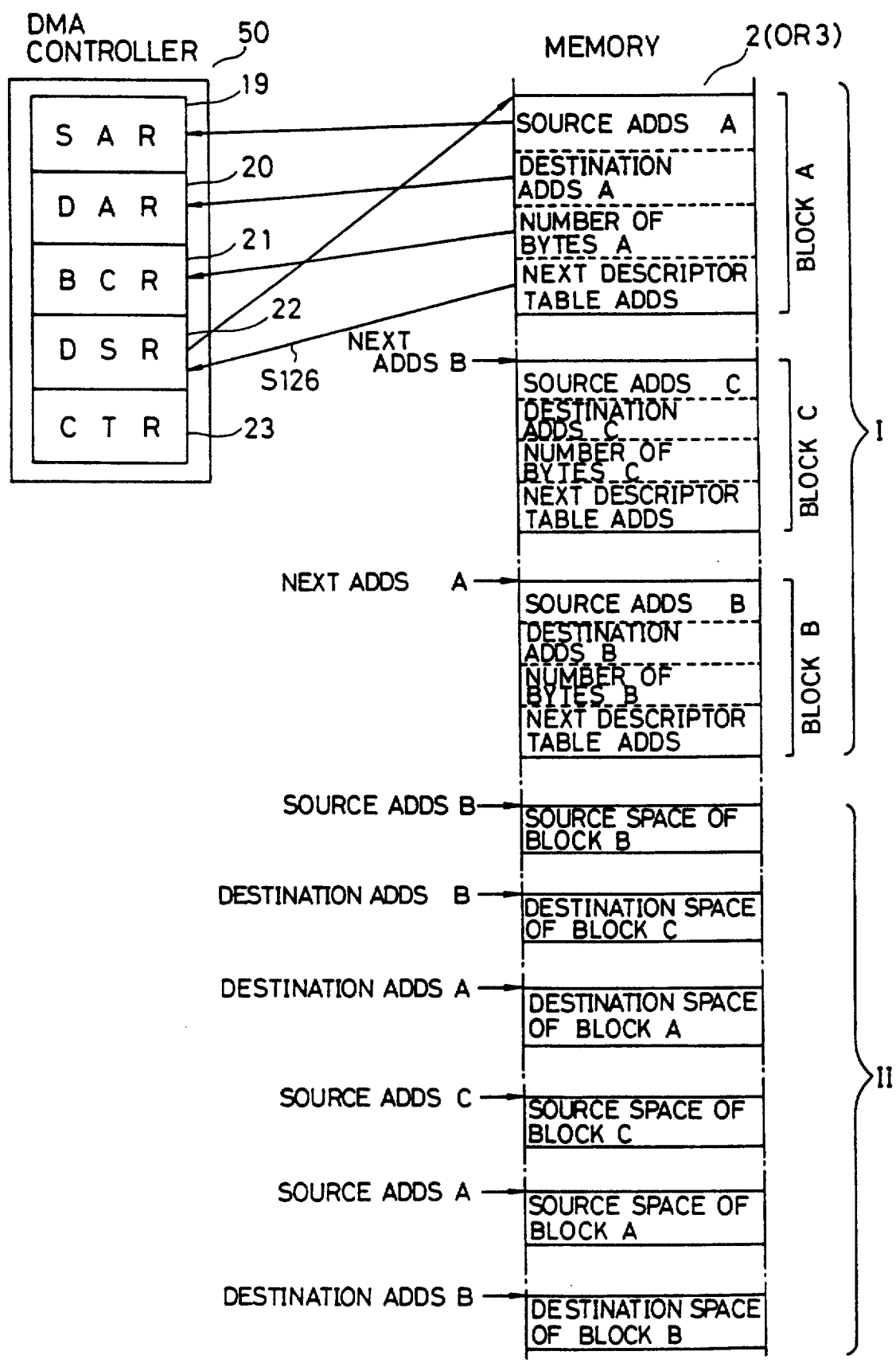

FIG. 5A illustrates an example of the link descriptor chain mode. The illustrated example relates to the case where the descriptor format code DF is "00". In this case, the descriptor format consists of the source address, the destination address, the byte count and a next descriptor address. The next descriptor address, which is to be registered in descriptor address register 22, indicates the start address of a memory area where there is stored a set of descriptors to be accessed at the next DMA transfer. This is because a set of descriptors relating to each block is not required to be successively stored in the descriptor table I. At first, the start address of a memory area in which the desired descriptors are stored, is written into the descriptor address register 22, and is then replaced with a start address of a memory area in which there are stored the descriptors relating to the next data block to be transferred. For example, at first, the source address A is accessed in accordance with the descriptor address registered in the descriptor address register 22. Then the next descriptor address A is read out from the table I and is written into the descriptor address register 22. Thereafter, the source address B relating to block B is read out in accordance with the next descriptor address A registered in the descriptor address register.

FIG. 5B illustrates an example of the contents of the descriptor table I in the link descriptor chain mode where the descriptor format code DF is "10". FIG. 5C illustrates an example of the contents of the descriptor table I in the link descriptor chain mode where the descriptor format code DF is "11". The use of the descriptor formats as illustrated in FIGS. 5B and 5C is the most important feature of the embodiment.

A description is given of operation of the embodiment. The following relates to the case where the sequential descriptor chain mode is set. The operation in the link descriptor chain mode will be also described in detail later.

Before supplying an instruction for the start of the DMA transfer with the DMA controller 50, the CPU 4 writes the descriptor table I in the memory 2 (or 3), and then writes the start address of the descriptor table I into the descriptor address register 22. After that, when the transfer request signal TREQ is input to the mapping PLA 15, an address for activating a predetermined microprogram is supplied to the micro-ROM 16 through the selector 13. Thereby, the microprogram stored in the micro-ROM 16 is activated.

It is now assumed that the code "00" of the descriptor format DF is set in the descriptor format register 11. At first, a decision is made in the selector PLA 12 by referring to the value in the descriptor format register 11, or the descriptor format code DF. In this case, since the descriptor format code DF is "00", the selector 13 selects the output of the increment element 14. Thereafter, the address of the micro-ROM 16 is sequentially incremented by 1, and the microprogram operates as follows. First of all, a control information CDA which instructs write of the source address, is output to the D unit 6. Then, the D unit 6 reads out the corresponding source address from the descriptor table I through the data bus 38, and writes the same into the source address register 19 in the transfer information setting block 18. Then, the address to the micro-ROM 16 is renewed, and the corresponding destination address is read out from the descriptor table I, and is then written into the destination address register 20. Finally, after renewing the address to the micro-ROM 16, the byte count information is read out from the descriptor table I, and is then written into the byte count register 21. That is, the source address, the destination address, and the byte count are successively written into the corresponding registers 19, 20 and 21 in this order. The above-mentioned writing operation carried out when DF="00", is identical to the operation of the conventional DMA transfer. As described previously, this operation is wasteful of memory capacity when the single transfer is to be carried out. The essential feature of the present invention is that a plurality of descriptor formats are provided. The description is given of cases of DF="10" and "11".

DF "10"

In this case, descriptors entered from the memory 2 or 3 (FIG. 1) are the source address and the byte count. This is suitable for the single transfer mode where data is read out from the memory 2 (or 3) and then transferred to the external memory through the I/O port 1.

When the microprogram stored in the micro-ROM 16 is activated by the application of the transfer request signal TREQ, the jump code JUMP C is derived therefrom, and supplied to the selector PLA 12. A decision is made in the selector PLA 12. In this case, since the descriptor format code DF is "10", the selector PLA 12 determines that the source address is necessary for the DMA transfer, and selects the output of the increment element 14. Then, the source address is read out from the memory 2 and is written into the source register 19 through the data bus 38 and the D unit 6. At this time, the memory area in which the source address is stored, is indicated by the address registered the descriptor address register 22.

After the source address is written into the source register 19, the jump code JUMP C is written again into the selector PLA 12, which thereby refers to the descriptor format code DF registered in the descriptor format register 11. At this time, the selector PLA 12 understands that no destination address is necessary. Then the selector PLA 12 selects the jump address JUMP A, which is output from the micro-ROM 16 in accordance with the microprogram when the writing for the source register 19 ends. In this case, the jump address JUMP A is address data which indicates a memory area in the micro-ROM16 in which there is stored a microprogram used for writing the byte count into the byte count register 21. Therefore, when the writing with respect to the source register 19 ends, the writing process with respect to the destination register 20 is jumped, and the byte count is written into the byte count register 21. Of course, the byte count to be written into the byte count register 21 is read out from the memory 2 and supplied thereto through the data bus 38 and the D unit 6.

DF "11"

In this case, the destination address and the byte count are read out from the memory 2 and are input into the corresponding registers. This is suitable for the DMA transfer where the external unit transfers data to the memory 2 or 3 through the I/O port 1.

When the microprogram is activated, the jump code JUMP C is derived from the micro-ROM 16, and the selector PLA 12 makes a decision on which code is registered in the descriptor format register 11. In this case, since the descriptor format code DF is "11", the selector PLA 12 understands that no source address is necessary to be written into the source register 19, and therefore selects the jump address JUMP A. At this time, the jump address JUMP A is address data which indicates a memory area in the micro-ROM16 in which there is stored a microprogram used for writing the destination address into the destination register 20. Then the jump address JUMP A is supplied to the micro-ROM 16, and the correspond microprogram is read out therefrom. Thereby, the writing of the destination address is carried out. When the writing ends, the jump address JUMP A is generated again. Then the selector PLA 12 makes a decision. In this case, since the descriptor format code DF is "11", the selector 13 selects the output signal of the increment element 11 in order to write the byte count into the byte count register 21. Then, a microprogram used for writing the byte count into the byte count register 21 is activated. Thereby, the byte count is read out from the memory 2, and written into the byte count register 21 through the data bus 38 and the D unit 6.

As described above, according to the present embodiment, by introducing the three descriptor formats designated by the codes "00", "10" and "11", it becomes unnecessary to register the source or destination addresses which is not necessary for the corresponding DMA transfer in the single transfer mode. For this reason, the memory 2 (or 3) can be efficiently and effectively used.

The above-mentioned embodiment relates to the descriptor chain mode. It is possible to combine the register direct mode and the descriptor chain mode. For example, the source address and the byte count are set by the descriptor chain mode which uses the descriptor format of DF="10". On the other hand, the destination address is set by the CPU 11 in the register direct mode (this is called a slave access by the CPU). This operation is suitable for the case where the destination address is fixed. Such the fixed destination address can be utilized as the initial setting value. For example, it is possible to carry out the DMA transfer between the memories 2 and 3 in such a way that a memory area to be written is fixed, and the source address and the byte count are set each time one block is transferred.

Generally, the DMA transfer is terminated when the chain terminator register 23 becomes zero. The value in the chain terminator register 23 is decremented by 1 each time one block is processed in accordance with the control information CDA derived from the micro-ROM 16 through the data latch element 17. The DMA transfer may be also terminated by a specific instruction (a DONE signal, which will be described later) supplied from the CPU 4 or the I/O port 1, for example, or a fatal error such as a bus error. When the DMA transfer is terminated due to the fatal error, it is unnecessary to enter the next descriptor format (a set of descriptors), and the CPU 1 (FIG. 1) can know the state of the DMA transfer obtained at this time by referring to the contents of the registers 19 through 23. On the other hand, in the DMA transferring operation, the descriptors written into the corresponding registers disappear, when the next descriptor format is written into the corresponding registers. Therefore, the CPU 1 cannot perceive the operating state of the DMA transfer observed at the time when the DMA transfer ends. For example, the DMA transfer is terminated when the chain terminator register 23 becomes zero (in the sequential descriptor chain mode), or a predetermined address of the descriptor table I (in the link descriptor chain mode). The DMA transfer is also terminated when the specific instruction (DONE signal) supplied from the CPU 4, for example, is supplied to the DMA controller 50 during the DMA transfer. For example, when the DMA transfer is intentionally terminated during the DMA transfer, it is impossible to identify the memory area in which the transferred data is already written. Therefore, valid data which has been transferred before the intentional termination, is no longer identified. This may be inconvenience for users.

A second embodiment described below is intended to overcome the above-mentioned inconvenience.

Figure 6:
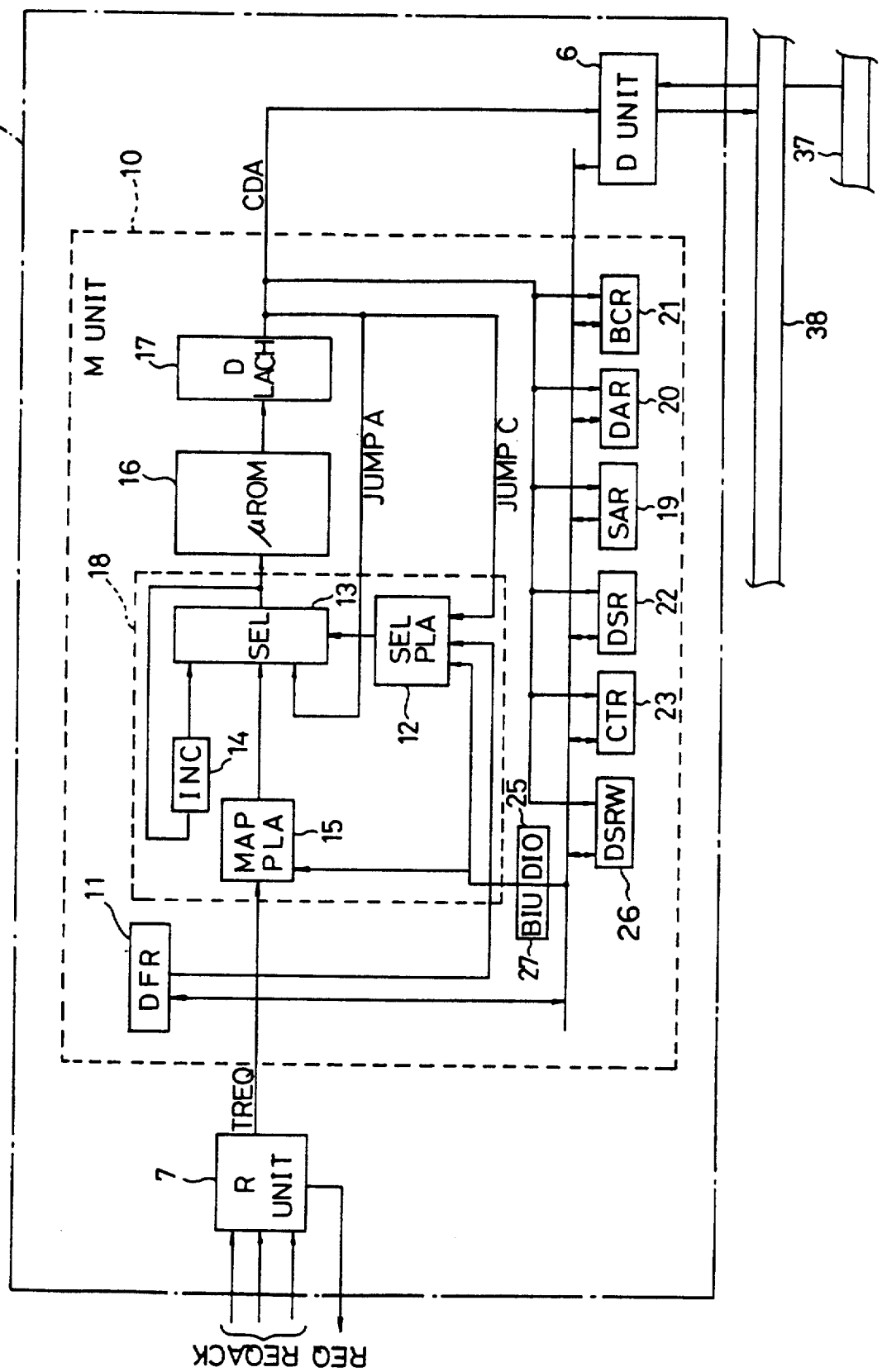
FIG. 6 is a block diagram of the DMA controller provided according to another embodiment of the present invention.

FIG. 6 is a block diagram of the second embodiment of the present invention. In FIG. 6, those parts which are the same as those in FIG. 3 are given the same reference numerals. The second embodiment is constructed by primarily adding a descriptor register address writing register (hereafter simply referred to DSRW register) 26, and a block information renewal register (hereafter simply referred to as BIU register) 27. When '1' is set in the BIU register 27, the contents of the source register 19, the destination register 20 and the byte count register 21 are written into the memory area in the descriptor table I which is designated by the address stored in the DSRW register 26. This is the most important feature of the second embodiment of the present invention. The DSRW and BIU registers 26 and 27 are provided with desired values by the CPU 4.

Additionally, in the second embodiment, a transfer termination request signal (hereafter simply referred to as DONE signal) is supplied to the selector PLA 12 and the mapping PLA 15 from the CPU 4 or other units through the control bus 39. Further, a DIO register 25 and an NBS register 28 are provided, which will be described later with reference to FIGS. 8A, 8B, 9A and 9B.

In the second embodiment, data is transferred in the same way as in the case of the first embodiment. According to the second embodiment, the operation with the registers 26 and 27 used, is added to the data transfer in the first embodiment. As indicated before, this operation is the most important feature of the second embodiment. The operation of the second embodiment is described below with reference to FIG. 6, as well as FIG. 7 showing essential parts of the structure shown in FIG. 6, which is used for describing the operation of the second embodiment.

By the control information CDA read out from the micro-ROM 16 in response to input of the transfer request signal TREQ, the address in the descriptor address register 22 is transferred to and written into the DSRW register 26, and the memory area in the memory 2 which is indicated by the descriptor address register 22, is accessed through the D unit 6. As described previously, the address in the descriptor address register 22 available at this time is the start address of the descriptor format relating to the first block (block A shown in FIG. 4A, for example). In the following description, the source address or the destination address, or the both is referred to as a memory address MA for convenience' sake. Therefore, when the descriptor format code DF is "10", the memory address MA is the source address, and when the descriptor format code DF is "11", the memory address MA is the destination address. Correspondingly, in FIG. 7, the source and destination registers 19 and 20 are illustrated with a single block named a memory address register (MAR).

In the illustrated example, a memory address MA1 and a byte count BC1 are accessed by the address registered in the descriptor address register 22 in this order. Then, the memory address MA1 and the byte count BC1 are read out from the memory 2, and written into the memory address register (19, 20) and the byte count register 21. At this time, the address in the descriptor address register 22 is renewed by a number amounting to the read-out data. Then, the D unit 6 is instructed by the corresponding microprogram read out from the micro-ROM 16, and then performs the DMA transfer between the memory 2 and the external unit through the I/O port 1, for example. Then, the value in the descriptor terminator register 23 is decremented by the number of transferred bytes. When the sequential descriptor chain mode is set, the value in the descriptor address register 22 is kept as it is. On the other hand, when the link descriptor chain mode is set, the value in the descriptor address register 22 is decremented by the number of transferred bytes. For example, when it is requested that data in the memory 2 is transferred to the external unit through the I/O port 1, the data block in the memory area designated by the address in the memory address register (19) is read out from the memory 2, and transferred to the I/O port 1. When the DMA transfer of the data block ends, the value in the BIU register 27 is looked up by the microprogram. The value in the BIU register 27 is set beforehand by the user.

If '1' is registered in the BIU register 27, the contents of the descriptor address register 22 and the DSRW register 18 are mutually exchanged. Then, the current contents of the memory address register (19, 20) and the byte count register 21 are sequentially written into the memory areas designated by the address in the descriptor address register 22. Thereafter, the contents of the descriptor address register 22 and the DSRW register 18 are mutually exchanged again. In this manner, the renewed data in the descriptor format due to the DMA transfer is written into the memory area from which the descriptors were read out.

On the other hand, when the renewal of the descriptor table is not requested, or in other words, '0' is stored in the BIU register 27, the renewal of the descriptor table is not carried out.

According to the second embodiment, in the case where the renewal of the descriptor table is requested, the renewed descriptors are written into the corresponding memory area in the memory 2 each time one data block is transferred by the DMA transfer.

When the value in the chain terminator register 23 becomes zero in the sequential descriptor chain mode, the DMA transfer is terminated. In the alternative, when the DONE signal is supplied to the selector PLA 12, the DMA transfer is intentionally terminated. When the DMA transfer is terminated, and the renewal of the descriptor table I is instructed by the BIU register 27, the CPU 4 reads the descriptor table I. Thereby, the CPU 4 can perceive the end state for every data block.

Figure 8A:
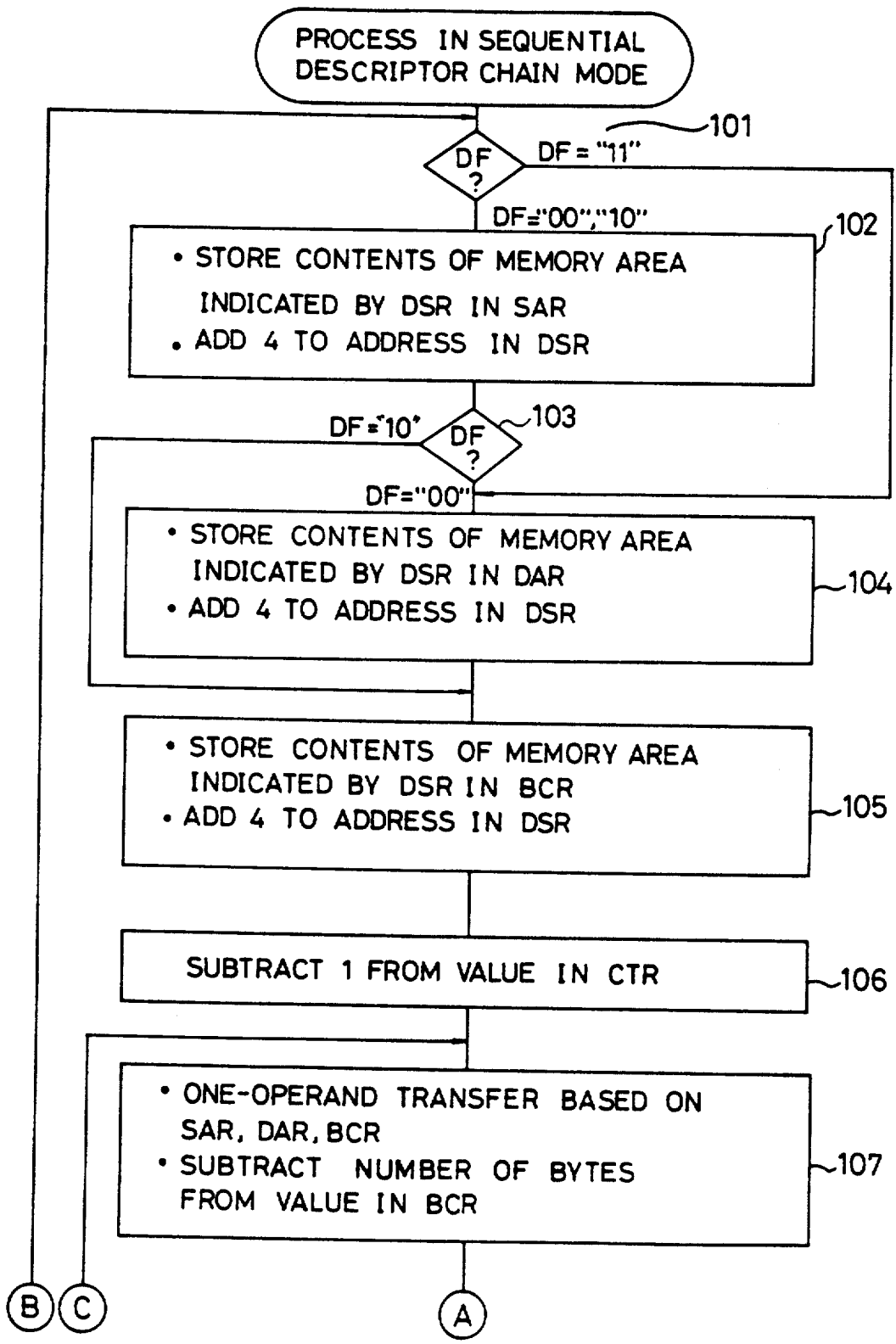
FIGS. 8A and FIG. 8B are flowcharts illustrating the sequential descriptor chain mode in the embodiment of FIG. 6.
Figure 8B:
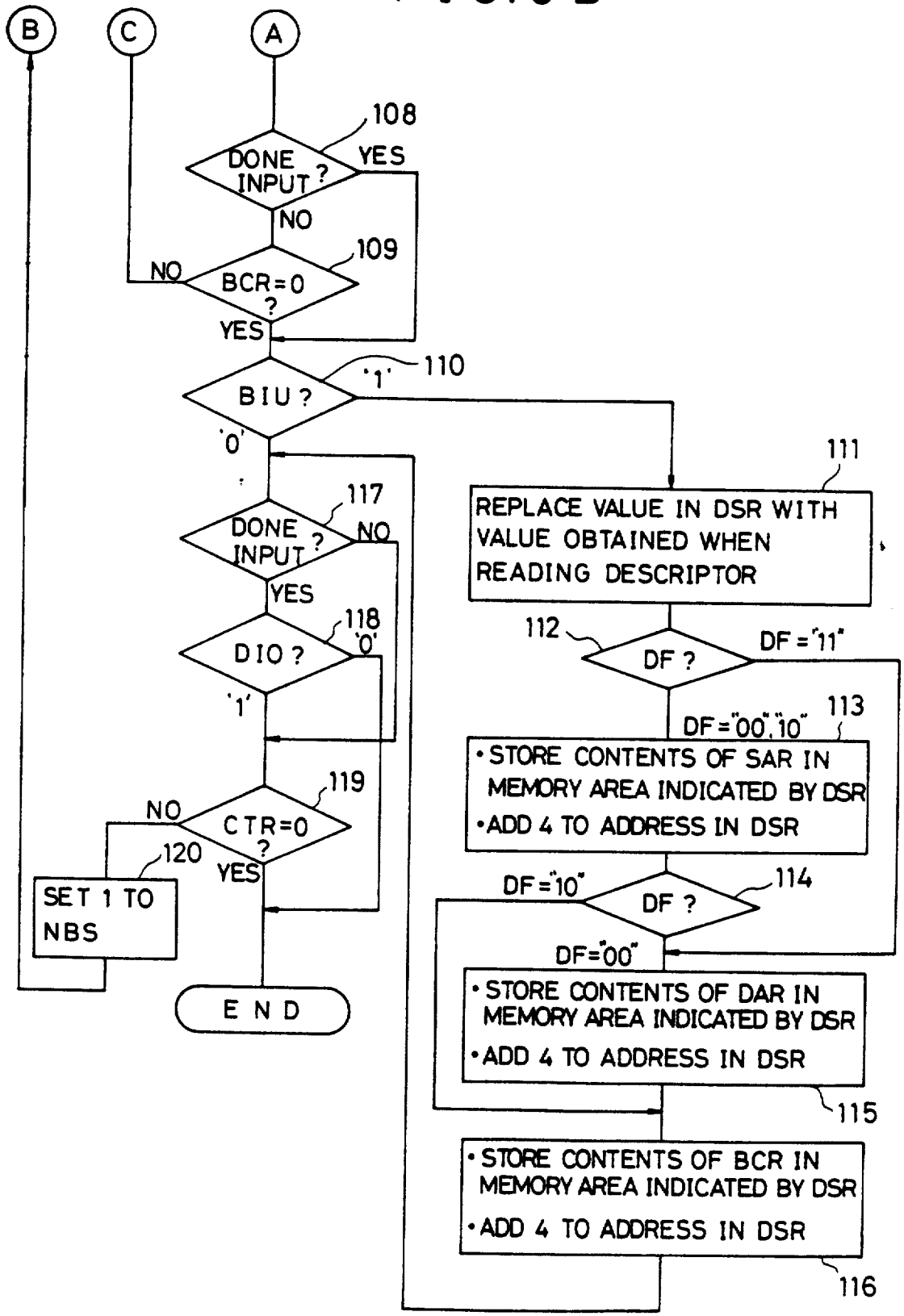
Figure 9A:
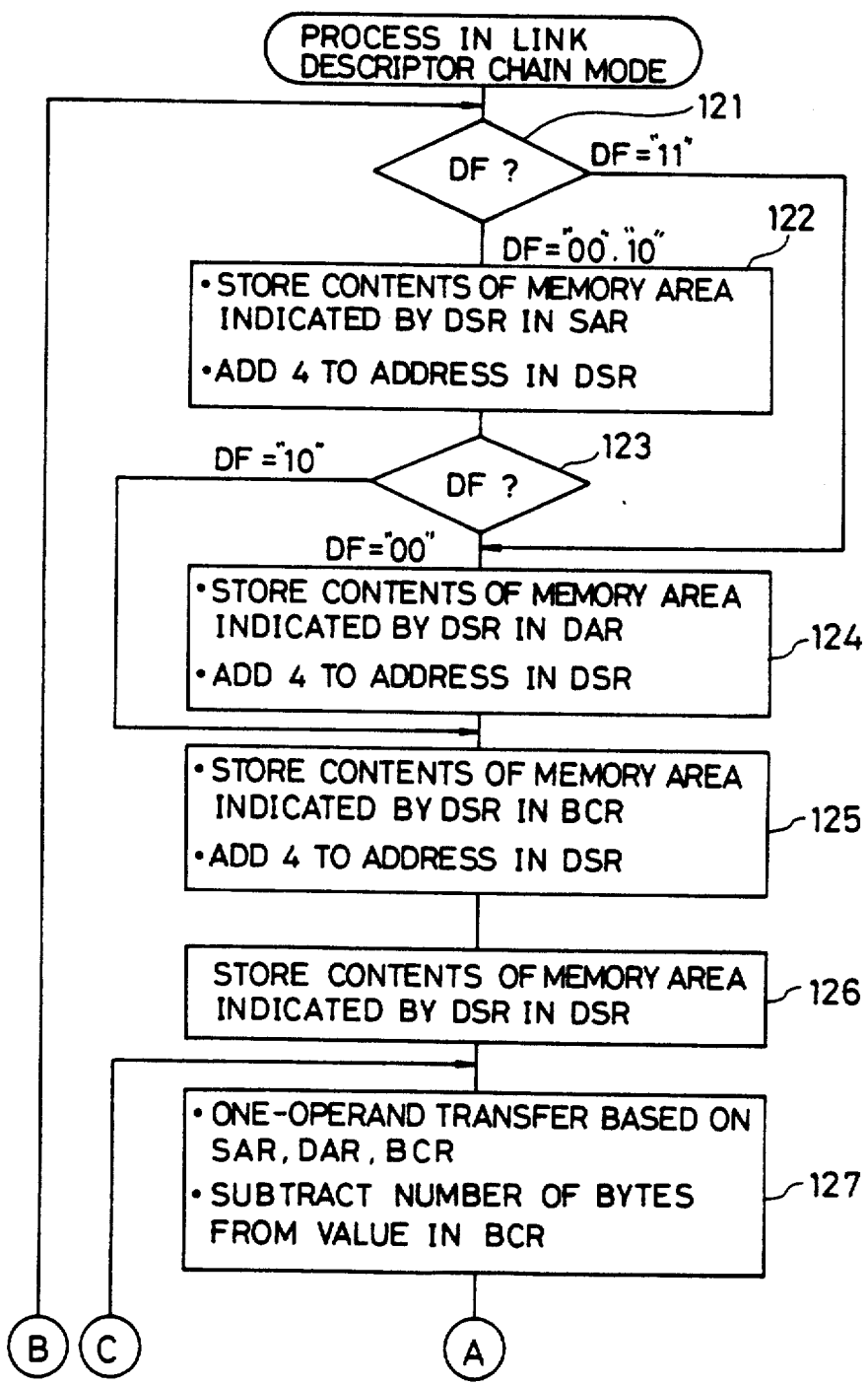
FIGS. 9A and FIG. 9B are flowcharts illustrating the link descriptor chain mode in the embodiment of FIG. 6.
Figure 9B:
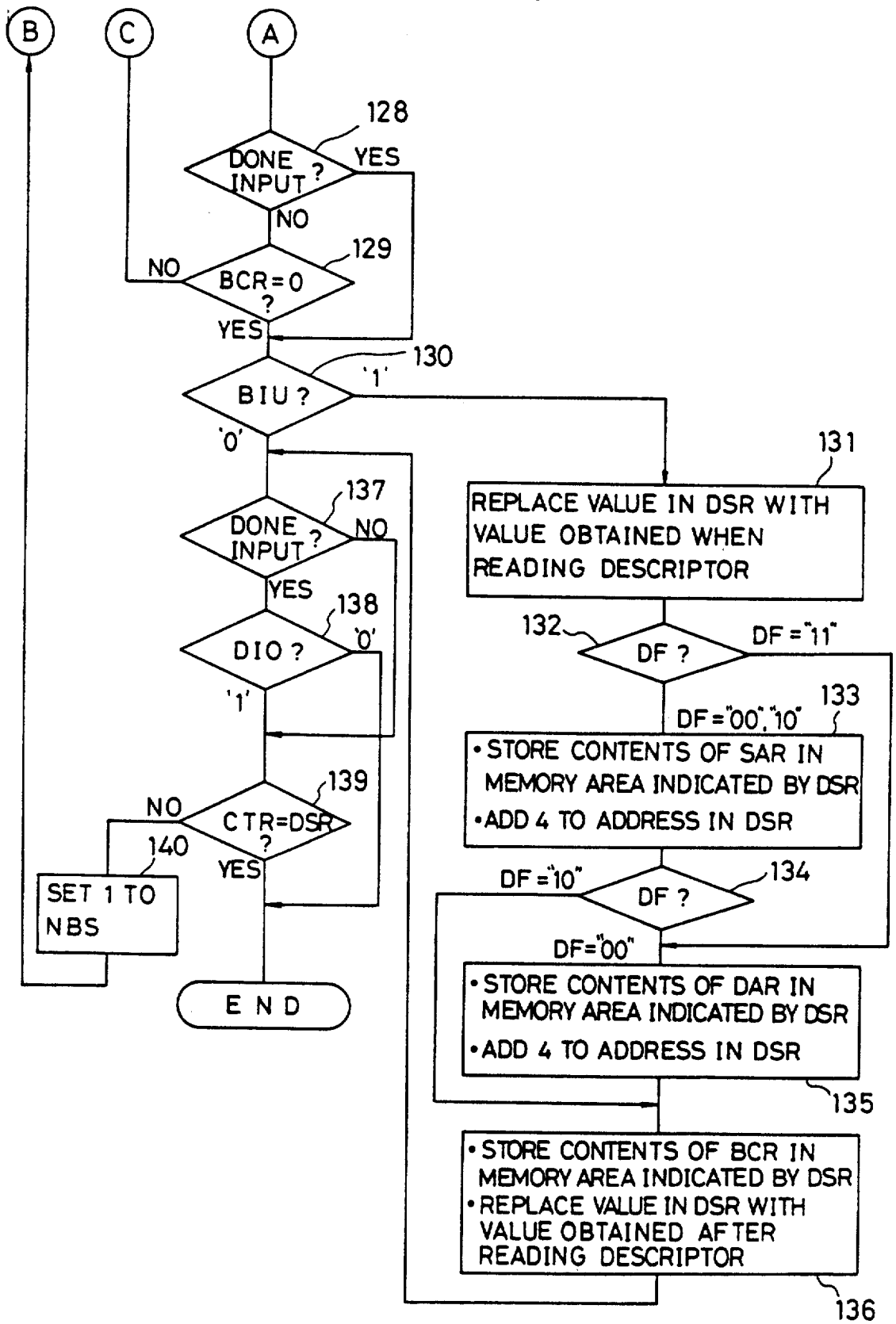

FIGS. 8A and 8B are flowcharts showing the operation of the second embodiment when the sequential descriptor chain mode is selected. FIGS. 9A and 9B are flowcharts showing the operation of the second embodiment when the link descriptor chain mode is selected. In FIGS. 8A and 8B, steps 101 to 107 relate to a procedure for the DMA transfer, and steps 108 to 116 relate to the renewal of the descriptor table I which is the most important feature of the second embodiment. The remaining steps relate to the additional function due to the presence of the DIO register 25 and the NBS register 28, as shown in FIG. 6. The procedure consisting of steps 101 to 107 holds true for the first embodiment.

Referring to FIG. 9A, the value in the descriptor format register 11 is checked (step 101). If the code DF="11", step 104 is processed. If the code DF="00" or "10", the contents of the memory area indicated by the descriptor format register 22 are written into the source register 19 (step 102). Further, in step 102, a value which corresponding to the data amount relating to the present memory area (4 bytes in the illustrated example) is added to the address value in the descriptor register address 22. Then it is determined whether the code DF is "00" or "10" (step 103). If the code DF is "10", step 105 is processed. On the other hand, if the code DF is "00", step 104 is processed. In step 104, the contents of the memory area indicated by the descriptor address register 22 are written into the destination register 20, and a value corresponding to the data amount relating to the memory area (4 bytes in the example) is added to the contents of the descriptor address register 22. Then the count value of the chain terminator register CTR 23 is decremented by '1' (step 106). Thereafter, in step 107, one-operand transfer is carried out by using the source address and/or the destination address, and the byte count. One operand corresponds to the number of bytes in one bus cycle. Further, in step 107, a value corresponding to one operand is subtracted from the value in the byte count register 21. Then it is determined whether or not the DONE signal is input (step 108). If the result is affirmative, step 110 is processed. On the other hand, if the result in step 108 is negative, step 109 is processed. In step 109, it is discerned whether or not the value in the byte count register 21 is equal to '0'. If the result is negative, one data block has not yet been transferred, and therefore, the procedure returns to step 107. On the other hand, if the result in step 109 is affirmative, step 110 is processed. In step 110, it is determined if the value in the BIU register 27 is equal to '1'. If the value in the BIU register 27 is '1', which means that the renewal of the descriptor table is requested, the procedure goes to step 111. On the other hand, if the BIU value is equal to '0', step 117 is processed.

As described previously, a sequence of steps 111 to 116 relates to the renewal of the descriptor table. In the above-mentioned second embodiment, the DSRW register 26 is used for holding the descriptors to be written into the corresponding memory area in the descriptor table I. On the other hand, in the sequence of FIG. 9B, the DSRW register 26 is not employed for the purpose of writing the descriptors in the corresponding memory areas. In step 111, the current value in the descriptor address register 22 is replaced with the value obtained when the descriptor is read out from the descriptor table I in step 102. Then it is determined which one of the descriptor format codes DF is registered in the descriptor format register 11 (step 112). If the code DF is "00" or "10", the address in the source register 19 is written into the memory area indicated by the descriptor address register 22 (step 113). Then, a value amounting to the address in the source register 19 (4 bytes in the example) is added to the address in the descriptor address register 22. Thereafter, in step 114, it is determined if the code DF is "10" or "00". If the mode DF is "10", step 116 is processed. Alternatively, if the code DF is "00", in step 115, the contents of the destination register 20 are written into the memory area indicated by the address of the descriptor address register 22. Then, a value amounting to the value in the destination register 20 (4 bytes in the example) is added to the address in the descriptor address register 22. Then, in step 116, the value in the byte count register 21 is written into the memory area indicated by the address in the descriptor address register 22, and a value amounting to the value in the byte count register 21 (4 bytes in the example) is added to the address in the descriptor address register 22. Then step 117 is performed.

In step 117, it is discerned again as to whether or not the DONE signal is input. This is carried out out of the bus cycle. If the result is affirmative, step 118 is carried out. Adversely, if the result is negative, step 119 is processed. In step 118, it is determined if the value in the DIO register 25 is '0' or '1'. If the value is '0', which means that the DMA transfer is requested to be terminated, the DMA transfer is terminated. On the other hand, if the value in the DIO register 25 is '1', it is determined if the value in the chain terminator register 23 is equal to zero (step 119). If the result is affirmative, the process ends. Adversely, if the result is negative, the NBS register 28 is set to '1' (step 120), which means that the DMA transfer relating to the next data block is requested. Then, the procedure returns to step 101.

The procedure of the DMA transfer carried out in the link descriptor chain mode is almost the same as that in the sequential descriptor chain mode except for steps 126, 136 and 138. In the link descriptor chain mode, step 126 is carried out in place of step 106. In step 126, the contents of the memory area indicated by the descriptor address register 22 are written into the descriptor address register 22. This procedure is indicated by a line (FIG. 5A) to which "S126" is attached. In step 136, the value in the descriptor address register 22 is returned to a value available after the descriptor is read. In step 139, it is determined whether the value in the chain terminator register 23 is equal to that of the descriptor address register 22. That is, in the link descriptor chain mode, the value in the chain terminator register 22 indicates an address at which the DMA transfer is to be terminated.

The above-mentioned procedures are controlled by the microprogram stored in the micro-ROM 16 associated with the selector PLA 12. It is easy for those skilled in the art to design the micro-ROM 16 and the selector PLA 12 from the above-mentioned description.

The present invention is not limited to the above-mentioned embodiments, and variations and modifications may be made without departing from the scope of the present invention.

What is claimed is:

1. A direct memory access controller coupled to a system bus of a system including a memory, for controlling a data transfer by a direct memory access, said direct memory access controller comprising:
   an internal bus;
   data control means coupled to said system bus and said internal bus, for controlling an exchange of data between said system bus and said internal bus;
   transfer request control means coupled to said internal bus, for receiving a transfer request signal;
   a register registering a code which designates one of a plurality of descriptor formats, each of which defines both the number and type of descriptors necessary for the data transfer by the direct memory access;
   register means for registering descriptors defined in one of said descriptor formats which is selected by the code registered in said register; and
   control means activated by said transfer request signal supplied through said transfer request control means, for controlling the data transfer by the direct memory access in accordance with the descriptors defined in said selected one of said descriptor formats registered in said register.

2. A direct memory access controller as claimed in claim 1, wherein said descriptor formats comprise a first descriptor format which includes a source address of said memory from which data to be transferred is read out, a destination address with which said transferred data is to be written into said memory, and a byte count indicating the number of bytes of data to be transferred.

3. A direct memory access controller as claimed in claim 2, wherein said first descriptor format further includes a next descriptor table address which indicates an address of said memory to be accessed for the next data transfer by the direct memory access.

4. A direct memory access controller as claimed in claim 1, wherein said descriptor formats comprise a second descriptor format which includes a source address of said memory from which data is to be transferred, and a byte count indicating the number of bytes of data to be transferred.

5. A direct memory access controller as claimed in claim 4, wherein said second descriptor format further includes a next descriptor table address which indicates an address of said memory to be accessed for the next data transfer by the direct memory access.

6. A direct memory access controller as claimed in claim 1, wherein said descriptor formats comprise a third descriptor format which includes a destination address with which transferred data is to be written into said memory, and a byte count indicating the number of bytes of data to be transferred.

7. A direct memory access controller as claimed in claim 6, wherein said third descriptor format further includes a next descriptor table address which indicates an address of said memory to be accessed for the next data transfer by the direct memory access.

8. A direct memory access controller as claimed in claim 1, wherein said register means comprises a source register which registers a source address of said memory from which data is to be transferred, a destination register which registers a destination address from which said transferred data is to be written into said memory, and a byte count register which registers the number of bytes of data to be transferred.

9. A direct memory access controller as claimed in claim 8, wherein said register means further comprises a descriptor address register which registers a start address of said descriptor format defined in a unit of data to be transferred.

10. A direct memory access controller as claimed in claim 1, wherein said control means comprises a micro-read-only memory (micro-ROM) which stores, in the form of a microprogram, control information used for controlling said register means, and transfer information setting means for supplying said micro-ROM with an address for reading out said microprogram.

11. A direct memory access controller as claimed in claim 10, wherein said transfer information setting means comprises first means for generating a start address or a branch address to be supplied to said micro-ROM, second means for successively generating an address to be supplied to said micro-ROM, third means for selecting one of said start address or branch address, said address and said control information, the selected one of these data being supplied, as address information, to said micro-ROM.

12. A direct memory access controller as claimed in claim 11, wherein said third means selects one of said start address, said successive address and said control information, on the basis of said code registered in said register and said control information supplied from said micro-ROM.

13. A direct memory access controller coupled to a system bus of a system including a memory, for controlling a data transfer by a direct memory access, said direct memory access controller comprising:
   an internal bus;
   data control means coupled to said system bus and said internal bus, for controlling an exchange of data between said system bus and said internal bus;
   transfer request control means coupled to said internal bus, for receiving a transfer request signal;
   a register registering a code which designates one of a plurality of descriptor formats, each of which defines both the number and type of descriptors necessary for the data transfer by the direct memory access;

register means for registering descriptors defined in one of said descriptor formats which is selected by the code registered in said register; and control means activated by said transfer request signal supplied through said transfer request control means, for controlling the data transfer by the direct memory access in accordance with the descriptors defined in said selected one of said descriptor format registered in said register means and for writing said descriptors being registered in said register means into a predetermined memory area in said memory when the data transfer ends.

14. A direct memory access controller as claimed in claim 13, wherein said control means comprises decision making means for making a decision whether or not said descriptors being registered should be written into said predetermined memory area.

15. A direct memory access controller as claimed in claim 13, wherein said control means comprises a register which registers the start address of a memory area where said descriptor in said selected descriptor format relating to data to be transferred is stored, when said descriptors relating to said start address are registered into said register means.

16. A direct memory access controller as claimed in claim 15, wherein said control means writes said descriptors being registered in said register means into said predetermined memory area which is designated by said start address.

17. A direct memory access controller as claimed in claim 16, wherein said register means comprises a descriptor address register which registers an address of said memory to be accessed, and wherein when said descriptors being registered are written into said predetermined memory area, the address in said descriptor address register and the address in said register are mutually exchanged, and thereby said predetermined memory area is accessed by the address registered in said descriptor address register.

18. A direct memory access controller as claimed in claim 17, wherein after said descriptors are written into said predetermined memory area, the address in said descriptor address register and the address in said register are mutually exchanged again.

19. A direct memory access controller as claimed in claim 17, wherein when said address registered in said descriptor address register which is available at the time when exchanged with said address in said register, is an address which indicates the start address of a memory area in which there are stored descriptors relating to data to be transferred in the next data transfer.

* * * * *